Figures 2, 5:
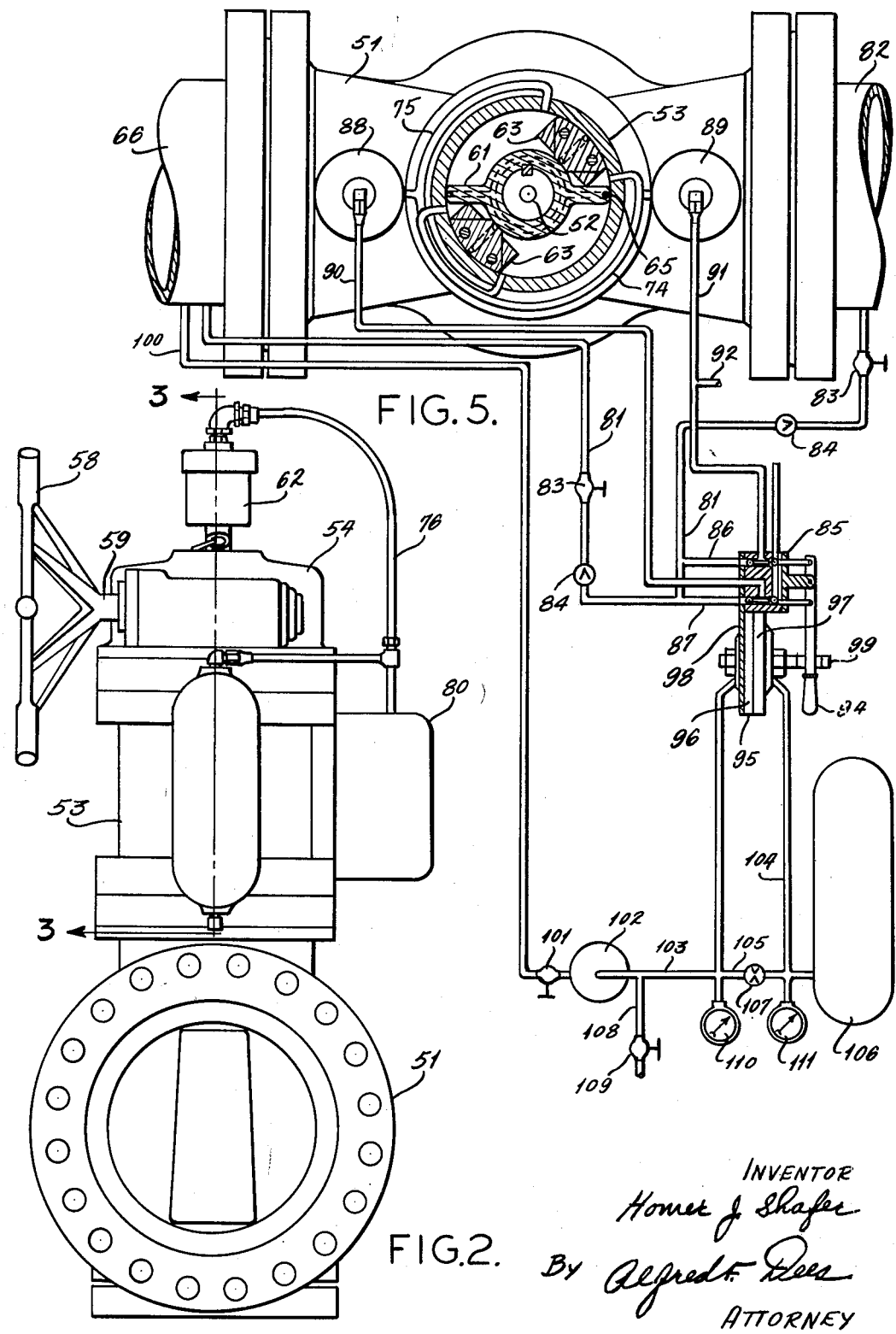

March 20, 1956     H. J. SHAFER     2,738,945

PRESSURE FLUID OPERATOR FOR PIPE LINE VALVES

Filed Oct. 2, 1951     5 Sheets-Sheet 1

INVENTOR
Homer J. Shafer
BY Alfred F. Rees
ATTORNEY

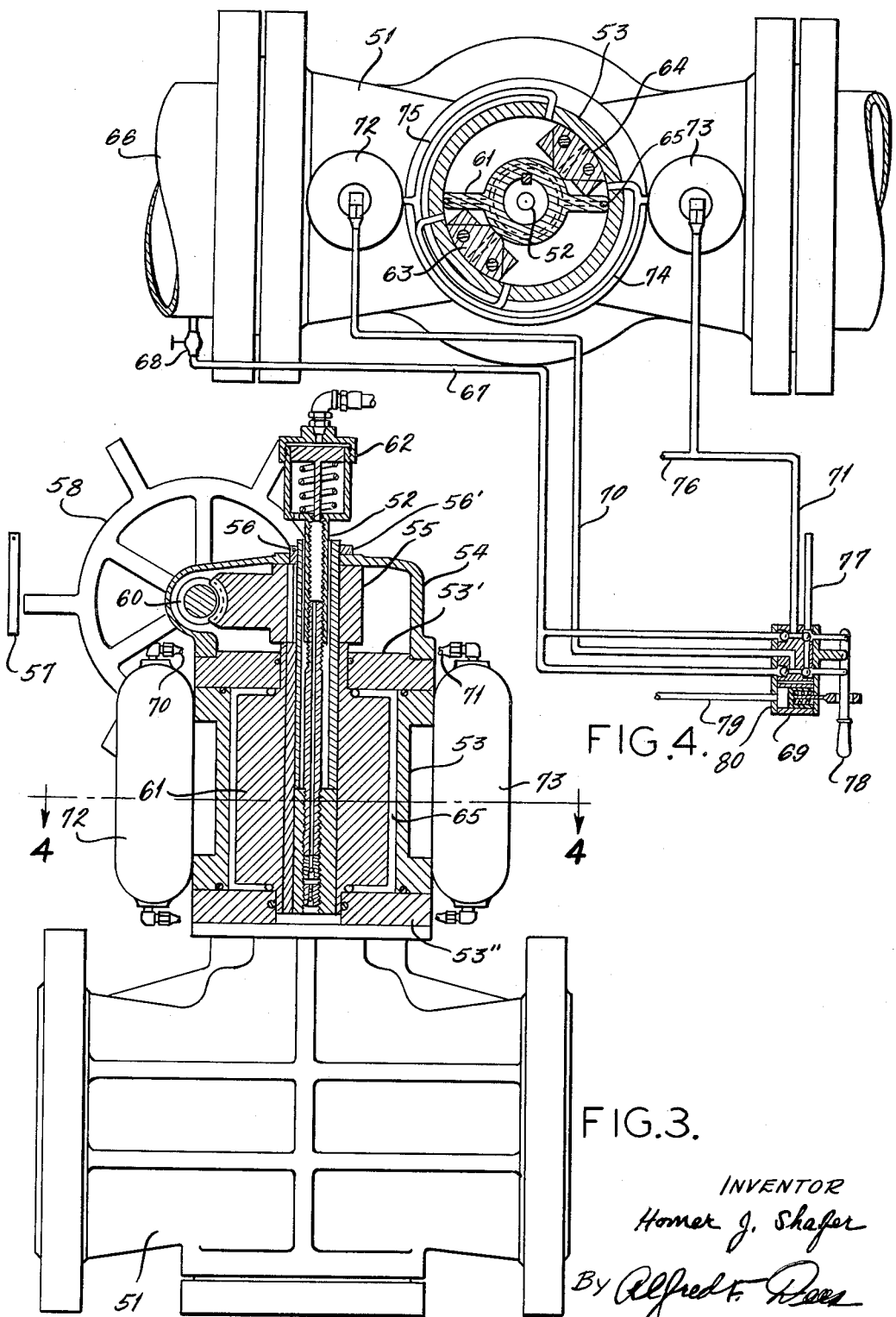

March 20, 1956 H. J. SHAFER 2,738,945
PRESSURE FLUID OPERATOR FOR PIPE LINE VALVES
Filed Oct. 2, 1951 5 Sheets-Sheet 3
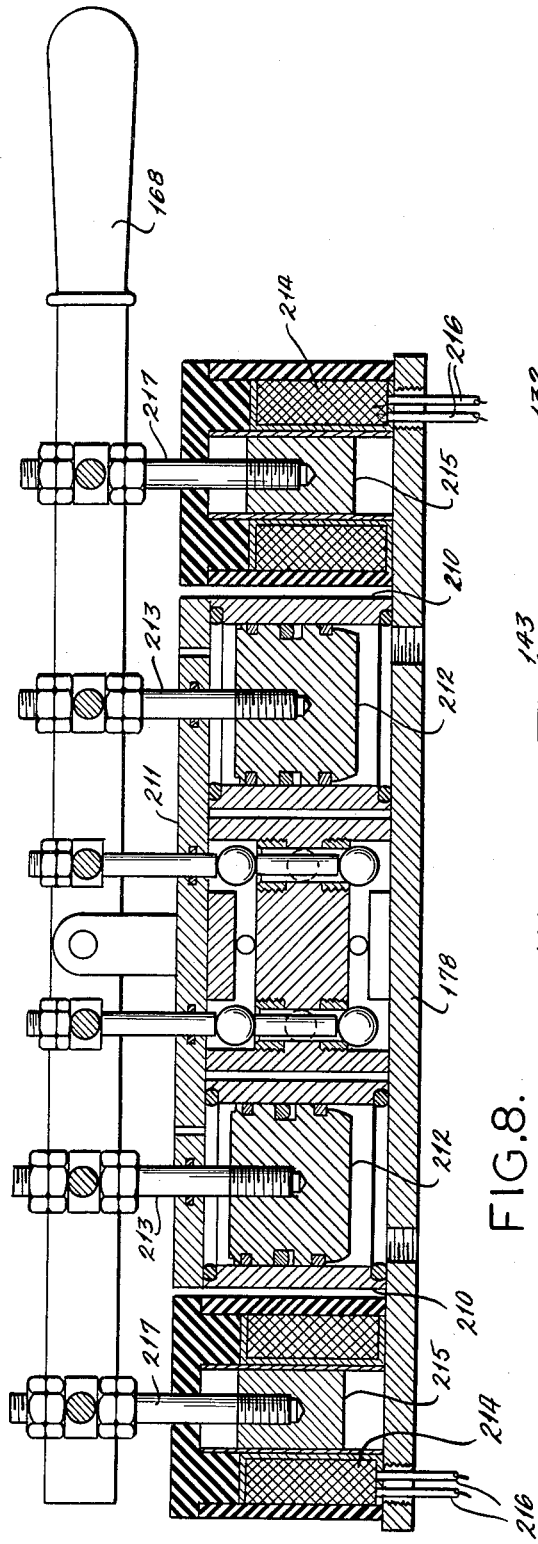
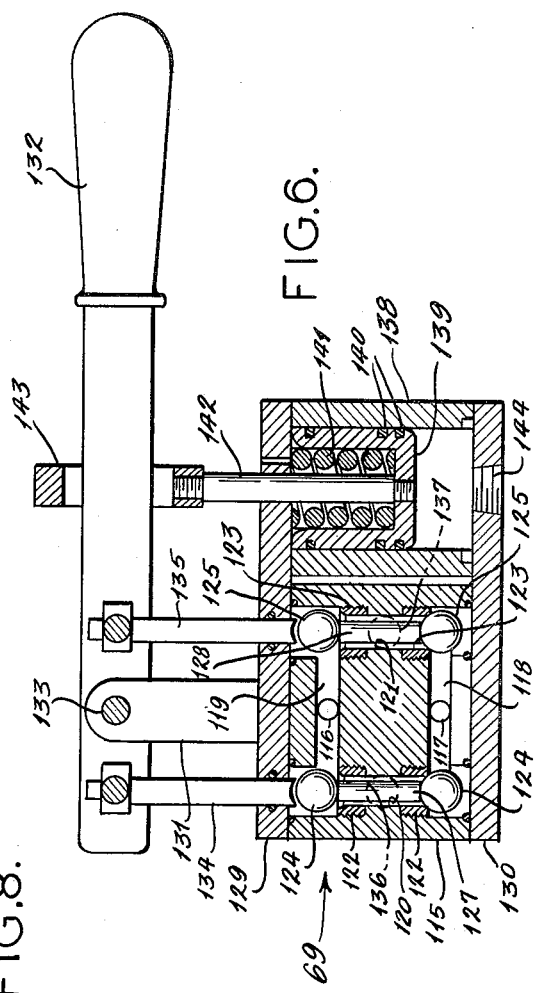
INVENTOR
Homer J. Shafer
By Alfred F. Rees
ATTORNEY March 20, 1956     H. J. SHAFER     2,738,945
PRESSURE FLUID OPERATOR FOR PIPE LINE VALVES
Filed Oct. 2, 1951     5 Sheets-Sheet 4

INVENTOR
Homer J. Shafer
By Alfred F. Rees
ATTORNEY

United States Patent Office 2,738,945
Patented Mar. 20, 1956

2,738,945

PRESSURE FLUID OPERATOR FOR PIPE LINE VALVES

Homer J. Shafer, Mansfield, Ohio, assignor to Mansfield Development, Inc., Mansfield, Ohio, a corporation of Ohio Application October 2, 1951, Serial No. 249,362

10 Claims. (Cl. 251—14)

This invention relates to mechanism for operating valves for pipe lines and is more particularly directed to an improved operator therefor that is particularly adapted for automatic, remote or interlocked control thereof.

One of the objects of this invention is to provide an improved pipe line valve operator in which the actuated parts are operated from an auxiliary source of pressure fluid derived from the pipe line in which the valve is installed.

Another object of the invention is to provide an operator for a pipe line valve capable of being operated by hydraulic pressure fluid, the fluid being under pressure from the pipe line or from an auxiliary pressure source.

A further object of the invention is to provide an improved valve for the control of the operator that is more efficiently operated from remote stations as well as manual and automatic operations thereof.

Other and further objects of the invention will occur to those skilled in the arts to which this invention pertains as the description proceeds which taken in connection with the accompanying drawings sets forth a preferred embodiment of the invention and selected modifications thereof but such disclosures are not to be construed as limitations of the invention which is defined in the appended claims and any and all modifications, alterations and variations of structure coming within the spirit and scope thereof are deemed to be included herein.

Figure 7:
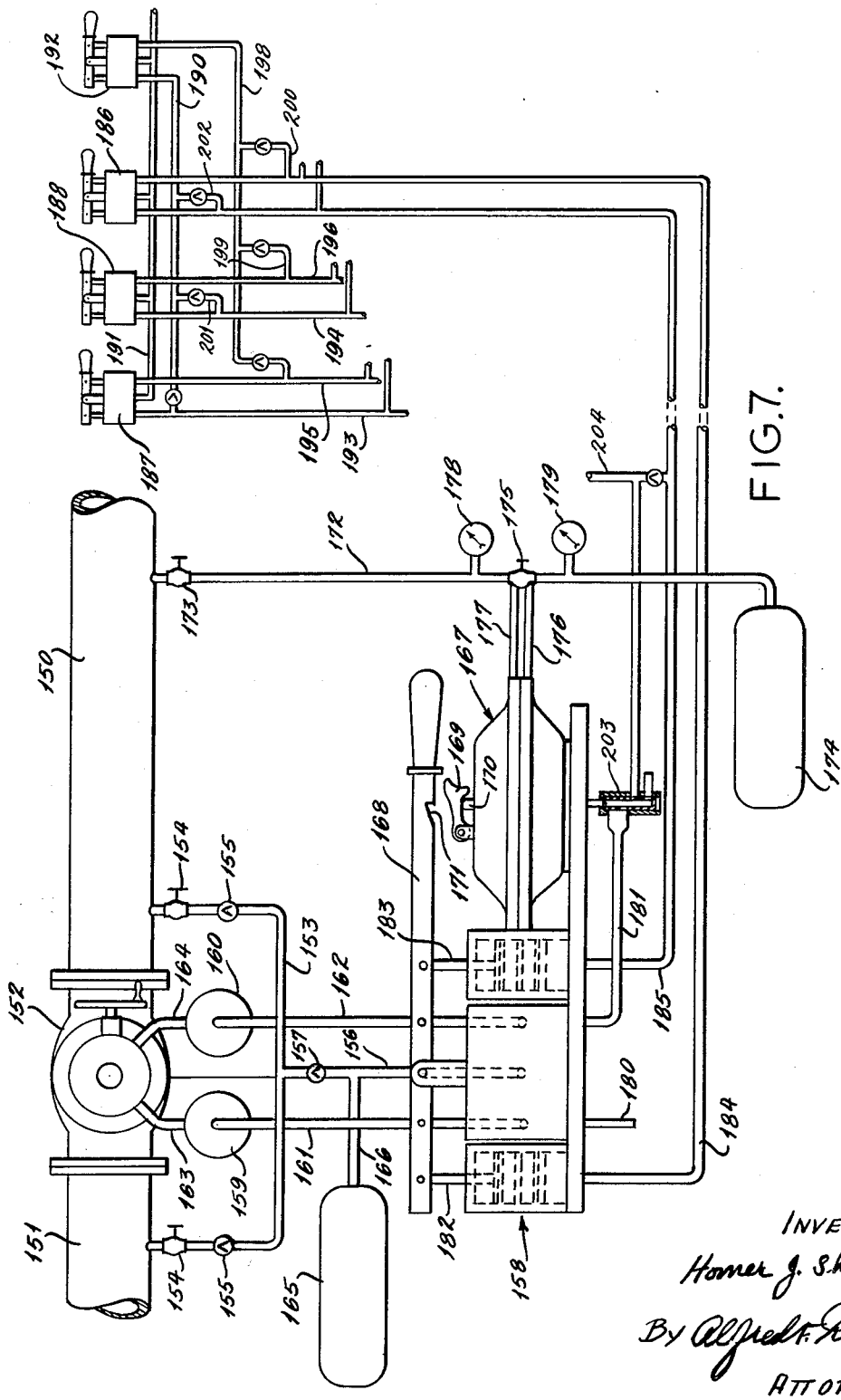
Figure 1:
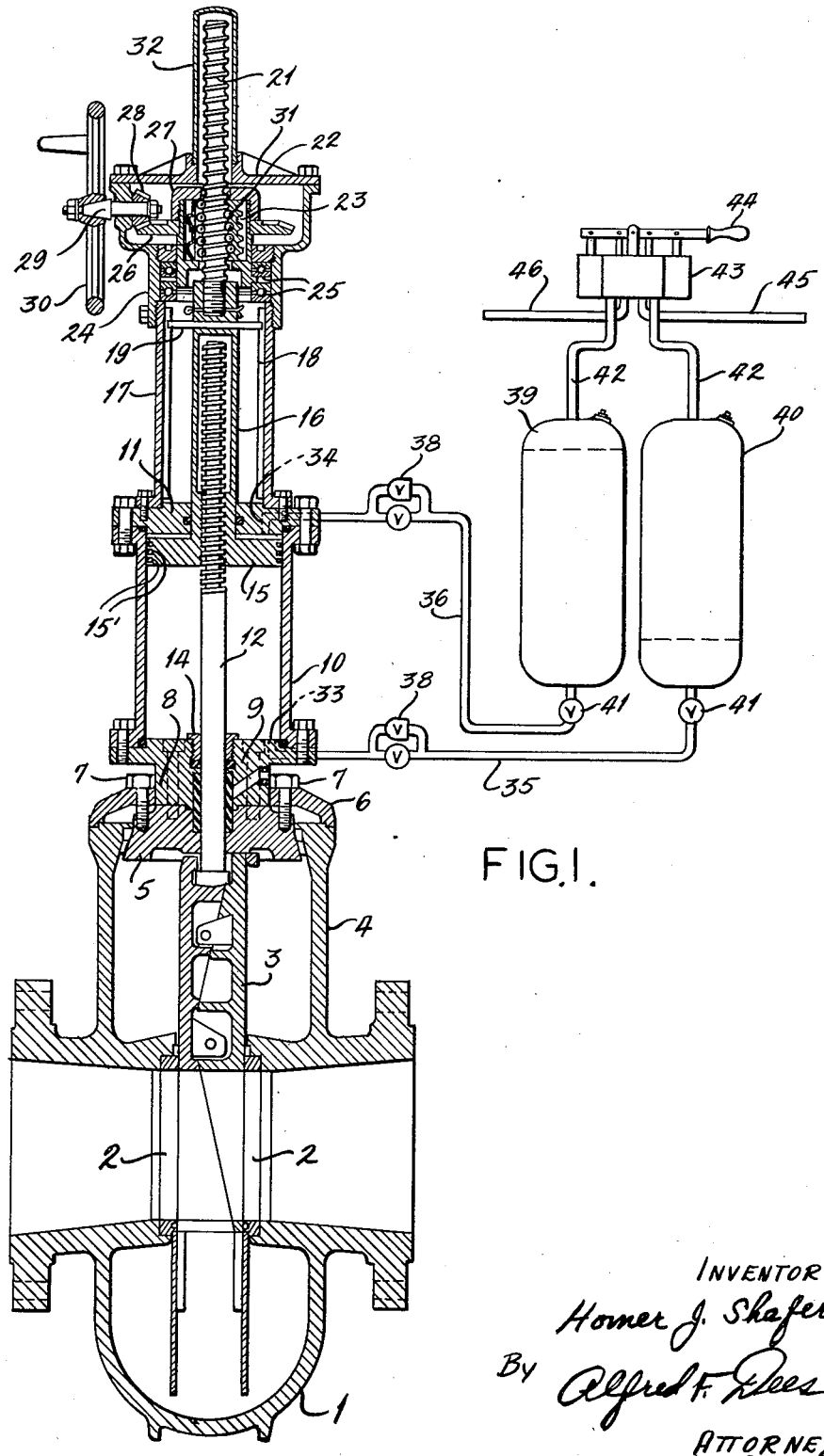

In the drawings:

Fig. 1 is a vertical sectional view of a gate type valve showing the improved operator control therefor, Fig. 2 is an elevational view of a plug type valve showing the improved operator embodied therein, Fig. 3 is a sectional view taken along the line 3—3 of Fig. 2, Fig. 4 is a sectional view taken along the line 4—4 of Fig. 3 showing the remote control operator thereon, Fig. 5 is a view similar to Fig. 4 but having an automatic operator therefor, Fig. 6 is a longitudinal sectional view of an improved reversing valve operator, Fig. 7 is a view showing the improved valve operator incorporating an interlock control therefor, Fig. 8 is a longitudinal sectional view of an improved form of a reversing valve employable in the Fig. 7 circuit.

One embodiment of the invention is disclosed in Fig. 1 of the drawings in which the numeral 1 designates the body of a pipe line valve. The valve body is provided with valve seats 2 with which a movable expansible valve element is engageable. Either of the valve seats may be on the upstream side of the pipe line. The lower portion of the body has a receptable for valve lubricant and a housing 4 is integrally associated therewith having a closure 5 removably secured therein. The closure is held in position in the open end of the housing by a clamp 6 actuated by screws 7 threaded into the closure 5.

A spacer 8 is fitted into the clamp 6 and rests on the closure 5. The head 9 of cylinder 10 is suitably secured to the spacer 8 and a head 11 is secured to the opposite end of the cylinder 10. A valve stem 12 is secured to the movable valve element 3 and extends through apertures in the head 9 and the spacer 8. Suitable lubricant and packing material is inserted in the aperture in the closure 5 and head 9. The lubricant is introduced in the space through a suitable duct and a bushing 14 is threaded into the head 9 for holding the packing and the lubricant therein and preventing the escape of pressure fluid past the bushing to atmosphere. A piston 15 having pressure seals 15' therein is slidably mounted in the cylinder 10 and has a hollow piston rod 16 thereon that extends upwardly through the head 11, there being suitable pressure seals therein for preventing leakage of pressure fluid into the tubular member 17.

The tubular member 17 is mounted on the head 11 by suitable fastening means. A sleeve 18 is mounted in the tubular member 17 and is mechanically associated with the piston rod 16 by means of a bar 19. The valve stem 12 has its upper end threaded into the piston 15, the stem then extending upwardly into the piston rod. A screw 21, the spiral of which is one of the raceways for antifriction members 22, is rigidly fastened to the solid end of the piston rod and extends through a nut 23 rotatably mounted in the hollow housing 24 threaded to the upper end of the tubular member 17. The nut is rotatably supported in the housing by suitable anti-friction bearings 25. The nut has a bevel gear 26 secured thereto by a crown nut 27, the gear meshing with a bevel pinion 28 secured to a shaft or spindle 29 rotatably mounted in the housing 24 and rotated by handwheel 30. Rotation of the handwheel will rotate the nut 23 relative to the screw 21 thereby actuating movable valve element 3 into and out of the valve body 1 depending upon the direction of rotation of the handwheel. The housing is provided with a closure 31 removably fastened thereto and a tube 32 is mounted thereon for enclosing the screw 21 and protecting the same. The tube 32 may be made from a transparent material, if so desired, and a suitable lubricant may be introduced into the housing 24 for lubricating the bearings 25 and the other operating parts in the housing. The foregoing constitutes the manual control for the opening and closing of the valve element 3.

The piston 15 is moved in cylinder 10 by means of hydraulic pressure fluid and each of the heads 9 and 11 have suitable ducts 33 and 34 therein to which conduits 35 and 36 respectively are secured. Each of these conduits has a check valve and a relief valve 38 connected therein for regulating the flow of liquid therein. Each of the conduits leads to oil or liquid pressure tanks 39 and 40. Stop valves 41 are connected in each of the conduits. The tanks are normally filled to the dotted lines and pressure is applied to the liquid in the tanks from a suitable source such as a pump or from the pipe line in which the valve body 1 is connected. Each of the tanks has conduits 42 and valves 41 respectively connected thereto which lead to a reversing valve 43 actuated by a handle 44 for selectively directing liquid or fluid under pressure into either of tanks 39 or 40. The fluid under pressure enters the reversing valve through conduit 45 connected to the source of pressure fluid and being exhausted to atmosphere through the conduit 46. The details of the reversing valve will be described in greater detail later in the specification.

The pressure selectively applied to the tanks 39 and 40 will flow through the conduits into either end of the cylinder 10. When entering the lower end of the cylinder liquid in the opposite end will flow toward tank 39 past relief valve 38. The relief valve acts as a brake when the pressure in tank 39 and tank 40 is equalized through valve 43. The volume of the tanks 39 and 40 is such that each has a content slightly greater than the volume of the space in the cylinder 10 between the piston 15 and either of the heads 9 or 11 thereby assuring that the piston will be moved by hydraulic pressure fluid and thus minimize loss of power during the operation of the valve. It is apparent that the element 3 may be moved relative to the valve body by manual or by fluid motor means.

Figs. 2-5 illustrate the above described mechanism applied to a plug type of valve in the remote as well as automatic control therefor. Figs. 3 and 4 show the remote control and Fig. 2 shows an end elevational view applicable to the Figs. 3 and 4 disclosure as well as to the Fig. 5 disclosure. The same reference numerals will be applied to all parts of the valve body and its operator and only the hydraulic circuit will be differently referenced.

The valve body 51 has a rotatable element therein (not shown) to which a valve stem is secured that extends upwardly from the valve body. This stem is rotatably received in a motor housing 53 provided with suitable end pieces or heads 53' and 53", the stem being rotatable in appropriate bearings and extending into and through a housing 54 mounted on the head 53'. A gear segment 55 is secured to the stem by means of a long slip key 57 when the valve plug is to be operated manually by means of a handwheel 58 secured to a spindle 59 on which a worm 60 is mounted that meshes with the gear segment 55. A vane 61 is secured to the valve stem 52 or an extension thereof. A lubricating element 62 is mounted on the valve stem for lubricating the plug valve during a specified portion of an operating cycle. Shoes 63 and 64 are mounted in the housing 53 for applying pressure fluid to either side of the vane 61 which is preferably doubled as illustrated. A suitable seal 65 is placed within the housing 53 and is provided with end members radial to the vane 61 for preventing leakage of pressure fluid from one side of the vane to the other side thereof. The lubricating device 62 and its operation is more completely described in co-pending application S. N. 189,810, filed October 12, 1950, and entitled Automatic Reclosing Device for Plug and Other Type Valves. The high pressure side of the pipe line may be connected to either end of the valve and in the ensuing description the lower end of Fig. 4 will be regarded as the high pressure end of the valve.

A short slip key 56 is provided that replaces the long slip key 57 when the indicator 56' is to be actuated. The function of this member has been fully described in the above identified co-pending application.

The pipe 66 on the high pressure side of the valve body 51 is suitably tapped and a conduit 67 is threaded therein in which a shut off valve 68 is inserted. The conduit leads to a reversing valve 69 constructed similar to the valve 43 above which will be described in greater detail later in the specification. The conduit 67 conducts pressure fluid into the valve at two parts thereof and the two outlet conduits 70 and 71 connect with the upper ends of tanks 72 and 73 respectively. The lower end of each of the tanks is connected to opposite sides of the vane 61 by means of suitable conduits connecting with ducts 74 and 75 respectively formed in the housing 53. These ducts terminate in the housing on opposite sides of the shoes 63 and 64 so that the vane will rotate in opposite directions depending upon the setting of the reversing valve 69. Pressure is selectively applied to either of the tanks which will force the oil or liquid therein into the housing 53 for rotating the vane. When the oil in one of the tanks is forced into the housing on one side of the vane then the oil or liquid on the opposite side of the vane is forced out of the housing into the other tank.

A conduit 76 is connected to conduit 71 and is also connected to the lubrication device 62 for lubricating the plug valve during the time that the tank 73 is being filled with oil from the housing 53. Exhaust pressure fluid is directed to atmosphere through conduit 77. The valve 69 may be manually operated by means of a lever 78 and may also be shifted by pressure fluid acting on a suitable piston device built into the valve as hereinafter described in greater detail. The reversing valve is actuated by pressure fluid conducted thereto through a conduit 79 having a remotely located valve (not shown) thus making it possible to actuate the reversing valve from a distance. The valve 69 is preferably located inside of a housing 80.

Actuation of the valve 69 will relieve pressure on one side of the vane 61 thus permitting the pressure on the opposite side thereof to rotate the vane and the plug valve member associated therewith when the short slip key 56 is installed in the valve operator. The liquid or oil in either of the tanks is moved into and out of the chambers in the operator through ducts 74 and 75 and the spent fluid under pressure is exhausted to atmosphere through the exhaust conduit 77. The action of the valve 69 is no different than that set forth above when pressure is applied to the conduit 79. At such time as pressure is applied to conduit 71, the conduit 76 will conduct pressure fluid to the lubrication device 62. The amount of oil or liquid in tanks 72 and 73 does not change but is moved into and out of the operator as pressure fluid derived from the pipe line is applied to either of the tanks.

An automatic control system for the operator is disclosed in Fig. 5 in which a conduit 81 is connected to the pipe 66 which is on the high pressure side of the valve body 51. This conduit is also connected to a pipe 82 connected to the valve body. Shut off valves 83 are connected in the conduit as well as check valves 84 so that either pipe 66 or 82 may be the high pressure side. The check valves 84 prevent the transference of pressure fluid from one pipe to the other.

A reversing valve 85 is connected to the conduit 81 by means of conduits 86 and 87. The reversing valve selectively directs pipe line pressure fluid into the tanks 88 and 89 through conduits 90 and 91 respectively. The tanks have an oil or liquid therein and as the pipe line pressure is selectively applied to the oil therein by selectively relieving pressure in the associated tanks the vane 61 will be rotated in the manner described above. A conduit 92 is connected between the conduit 91 and the lubricating device 62 for the purpose of forcing lubricant into the plug valve whenever pressure is admitted into the conduit 91. Exhaust or spent fluid is exhausted to atmosphere through conduit 93. A handle 94 is provided for manually actuating the valve thereby opening or closing the pipe line valve.

Means are provided for actuating the pipe line valve to closed position in the event there is a failure of pressure in the pipe line. This device consists of a fluid motor 95 comprising a pair of hollowed out heads 96 and 97 having a diaphragm (not shown) disposed therebetween and suitably fastened together all mounted on a supporting plate 98 which also carries the reversing valve 85. This mechanism is more particularly described in applicant's copending application identified above. The plunger 99 secured to the diaphragm is connected to the handle 94 and when the latter is moved the reversing valve is adjusted for either opening or closing the plug valve to which the vane 61 is connected.

The diaphragm is actuated by pressure fluid derived from the pipe 66 which has a conduit connected thereto in which a shut off valve 101 is inserted. The conduit 100 is connected to the lower end of a dryer tank 102 in which a suitable gas drying substance is introduced. A conduit 103 is connected to the other end of the dryer tank and leads to the fluid motor 95 for applying pressure to one side of the diaphragm therein for normally holding the handle 94 in such position that the plug valve will be in open position. A conduit 105 is connected to the conduit 103 and has a fitting 107 therein provided with a fixed and somewhat restricted orifice. The conduit 105 terminates in a reservoir 106 for storing pipe line pressure. A conduit 104 is connected to the motor 95 and is also connected to the conduit 105 so that the diaphragm therein is subjected to pipe line pressure that acts in opposition to the pressure introduced into the motor through conduit 103. A conduit 108 is connected to the conduit 103 and has a shut off valve 109 which when opened will cause the motor to operate thus simulating a break or failure of pressure in the pipe line. Gages 110 and 111 are connected to the conduits 103 and 105 for measuring pressure in the conduit 103 and reservoir 106. A spring (not shown) is provided in motor 95 for moving the handle 94 to pipe line valve open position whenever both sides of the diaphragm in motor 95 are subjected to pipe line pressure although the necessary resiliency may be built in and inherent in the diaphragm.

The operation of the valve motor vane 61 by reason of pressure fluid controlled by reversing valve 85 is identical to that described above whenever it is to be manually operated. When the vane is to be controlled by automatic operation of the valve 85 the short slip key 56 replaces the long key 57 whereupon the fluid motor 95 may actuate lever 94. In the event that there is a drop or failure of pressure in the pipe line the pressure in conduit 103 will also drop whereupon the pressure acting on the motor diaphragm from the reservoir 106 will move handle 94 for the purpose of adjusting valve 85 so that the vane will close the plug in the valve body 51 and the indicator 56' will designate the position of the valve plug. The orifice in fitting 107 will prevent or delay the escape of pressure fluid from reservoir 106 long enough so that the motor will have actuated handle 94 and valve 85. The latter are moved reversely manually after the pipe line pressure has been restored. As indicated above a pipe line pressure failure may be simulated by opening valve 109 for the purposes of testing the operation of the device.

The reversing valve 69 in Fig. 6 is shown in enlarged form and consists of a body member 115 provided with ducts 116 and 117, the former being an exhaust duct and the latter an inlet duct. These ducts connect with transverse ducts 118 and 119 each of which connects with bores 120 and 121. Each of the bores have bushings 122 and 123 threaded therein which form seats for valves 124 and 125. The valves are connected together by means of rods 127 and 128 so that one of each of the connected valves will be seated while the other is unseated. Plates 129 and 130 are secured to opposite sides of the body 115 and suitable packings are provided for preventing leakage of pressure fluid.

A bracket 131 is secured to the plate 129 and a handle 132 is pivotally supported thereon by means of a pin. Valve actuators 134 and 135 are suitably connected to the handle and extend through the plate 129, there being suitable packing means provided for preventing the escape of pressure fluid. Ports 136 and 137 are also provided which have the conduits 71 and 70 connected thereto. Conduit 67 is connected to the duct 117. Conduit 77 is connected to the duct 116.

A cylinder 138 is disposed between the plates 129 and 130 in pressure tight relationship and a piston 139 is slidably received therein. The piston has a plurality of pressure sealing rings 140 thereon as is customary in the art. A piston rod 142 is secured to the piston and extends through the plate 129 and has a collar or yoke 143 secured thereto through which the handle 132 extends. Conduit 79 is connected to the port 144 for the admission of compressed air or any other suitable pressure fluid whereby the valve 69 may be operated from a remote position. A spring 141 is disposed within the cylinder and about the rod 142 and is in engagement with the plate 129 and the piston 139. When the pressure is released in the conduit 79 the spring pushes the piston down thus actuating the handle 132. From the foregoing it is evident that the reversing valve may be actuated manually or by a piston-cylinder device controlled from a remote station.

An interlock control circuit for a valve operator is disclosed in Fig. 7 in which pipes 150 and 151 are connected to a plug valve and operator 152, the plug valve and operator being constructed in a manner similar to those described in connection with Figs. 1–5. Either of the pipes 151 or 150 may be the high pressure or upstream side of the valve and the conduit 150 will be so regarded.

A conduit 153 bridges the valve 152 and has a shut off valve 154 near each end thereof as well as check valves 155. The latter valves prevent loss of operating fluid from the system in the event of a failure of any kind in pipe line pressure. A conduit 156 is connected to the conduit 153 and a check valve 157 may be provided therein if so desired. The conduit is connected to reversing valve 158 and pressure fluid conducted thereto is selectively applied to the oil in tanks 159 or 160 through conduits 161 and 162 respectively. Oil in tanks 159 and 160 is applied under pressure to the vane motor in the valve operator through conduits 163 or 164. The action of the oil in these tanks in relation to the motor is identical to that illustrated in connection with Figs. 1–5. A reserve supply tank 165 is connected to the conduit 156 by means of a conduit 166, the reserve tank pressure operating the motor in the event of a total failure of pressure in the pipes 150 and 151. The exhaust pressure fluid is directed into conduits 180 and 181 as will be later more particularly described. A more complete description of the reversing valve will be given in connection with Fig. 8 which shows the construction details thereof.

The reversing valve is actuated by a diaphragm type of pressure fluid motor 167 which has a plunger therein for operating a latch 169 pivotally mounted on the fluid motor. This motor is so arranged that the valve 152 will be closed when there is a drop or other failure of pressure in the pipes 150 and 151. The plunger will pivot the latch into engagement with the lever 168 thereby actuating the reversing valve 158. The latch will engage with notch 171 in the lever and hold or lock it in adjusted position so that it must be manually released before the valve 152 can be reopened. The source of the difficulty in the pipe line must be removed before the operator will release the latch, the operator assuring himself that all is in order before restoring the line to operation.

The diaphragm motor is operated by pressure fluid derived from the pipe line. A conduit 172 is connected or tapped into the pipe 150 and has a shut off valve 173 connected therein. A reservoir 174 is connected to the conduit 172. A fitting 175 having a small orifice therein is connected in the conduit 172 and conduits 176 and 177 are connected into the conduit 172 on opposite sides of the fitting 175 that terminates in the chambers in opposite sides of the diaphragm in the motor 167. Gages 179 and 178 measure the pressure in the pipe 150 and in the reservoir 174. The motor 167 will be actuated by the pressure in the reservoir upon failure of pressure in the pipe 150 and the orifice will prevent escape or retard flow of pressure fluid from the reservoir until after the motor 167 has adjusted reversing valve 158 or in other words the rate of escape or pressure from the reservoir will be so slow that the valve will be adjusted before it empties.

The reversing valve 158 can be operated from a remote station or series of stations or from another valve in the system in which the valve 152 is connected through the exhaust impulse derived from said other valve or series of valves. The reversing valve 158 has a pair of pistons therein mounted on opposite sides of the reversing portion thereof and slidable in cylinders provided therefor. The pistons are provided with rods 182 and 183 pivotally connected to the manually operated lever 168. Each of these cylinders has conduits 184 and 185 respectively connected thereto that lead to a selector valve 186 for controlling the admission of pressure fluid to either of the conduits 184 or 185. The valve 186 may be interconnected with two or more similar valves 187 and 188 and may also be interconnected with a master selector control valve 192. A conduit 191 is connected to a suitable source of pressure fluid supply and provides the means for delivering fluid under pressure to each of the valves. One side of each of the valves 187 and 188 have conduits 193 and 194 respectively connected thereto which are connected to other control valves. Conduits 195 and 196 are connected to the other side of the valves 187 and 188. And are connected to the conduit 198 leading to the master valve 192 and have suitable check valves therein for permitting flow of pressure fluid from the master valve but not towards it. The conduits 184 and 196 are connected to conduit 198 through conduits 199 and 200 and each has a check valve therein serving the same purpose. The conduit 190 connects the master valve 192 with the conduits 193, 194 and 185, the latter having jumper conduits 201 and 202 interposed and each conduit has a check valve therein for permitting fluid to flow from the master valve but not towards it. The exhaust line 181 has a diverter valve 203 connected therein actuated by the plunger 170 of the pressure fluid device 167. The conduit 181 leads to another valve and constitutes the impulse line for directing exhaust impulses to the device 167 for closing valve 152 when a pressure drop occurs in the pipe line leading to the associated valve. A check valve is connected between conduit 181 and the conduit 185 actuating the piston connected to the plunger 183. Impulses originating in the operator for valve 152 are transmitted through conduit 181 and valve 203 to the impulse conduit 204.

The operation of the interlock as to the remote control is as follows: Assuming that the valve 152 is open and there is a pressure drop or failure in the pipe line 150 and that valve 173 is open, this will cause a pressure drop in the chamber in fluid motor 167 connected thereto. Since the other chamber in the motor is under line pressure derived from reservoir 174 it will force the diaphragm in the motor upwardly, as viewed in Fig. 7, causing plunger 170 to lift latch 169 against handle 168 and thereby actuating valve 158 so that pressure fluid from tank 159 or 160 will rotate the vane for the valve 152 operator thereby closing it. The lever 168 cannot be reversely moved until latch 169 is manually released whereupon lever 168 may be reversely moved as soon as the operator is satisfied this may be done. If a pressure impulse is received from another valve in the system it is transmitted through conduit 204, then past the check valve therein and into the cylinder in the right hand side of the control valve 158 where it will cause the valve 152 operator to close the associated valve in the manner set forth above.

The valve 152 may also be opened and closed from valves 186, 187 and 188 as well as 192 because by an opening or closing of any one of these valves pressure fluid controlled thereby will be selectively admitted to either of the cylinders actuating the control lever 168 for reversing valve 158. Pressure fluid, gas, is exhausted from conduit 180 or through the valve actuated by plunger 170, through conduit 181.

The valve 158 of Fig. 7 is shown in greater detail in Fig. 8. The reversing valve portion thereof is constructed in the same manner as the valve portion shown and described in connection with Fig. 6 except that an auxiliary exhaust port is provided for the conduit 181. The supporting plate 178 has cylinders 210 mounted thereon on opposite sides of the valve element. A cover plate 211 is provided to which each of the cylinders is secured as well as to the plate 178. Suitable seals are provided for preventing the escape of pressure fluid. A piston 212 is slidably mounted in each of the cylinders and each is provided with suitable pressure sealing rings well known in the art. Each piston is equipped with a piston rod 213 pivotally connected to the handle 168. The piston rods 213 extend through the cover plate 211 and suitable vents are provided therein for permitting air to breathe into and out of the space above the pistons.

The supporting plate 178 has solenoids 214 suitably mounted thereon and each is provided with a plunger 215. The leads 216 of the solenoid are connectable to suitable switches in a remote control station whereby the reversing valve may be actuated. A connecting member 217 is disposed between the lever 168 and the plunger, the connecting member being suitably pivotally connected to the lever to permit swinging movement thereof as well as the piston rods.

That which is regarded new, novel and useful and which is sought to be protected by Letters Patent of the United States of America is as follows.

I claim:

1. An operator for a rotary valve connected into a pipe line for conducting fluid under pressure comprising a fluid motor; a reversely movable double vane rotor therein connected to the reversely movable element of the valve; a pair of tanks having liquid therein; means for connecting each of said tanks with said pipe line for placing the liquid therein under pressure; means for conducting liquid under pressure to opposite sides of said rotor; a reversing valve for selectively applying the liquid under pressure to opposite sides of said rotor for reversely moving same; a manually operable means connected to the rotor for reversely moving same; and means responsive to changes in pipe line pressure for actuating said reversing valve.

2. An operator for a pipe line valve comprising a fluid motor having a movable member therein connected to the movable element of the valve; manually operable means on the operator for actuating the movable member; a pair of tanks having liquid therein; a conduit connecting one end of each of the tanks and the pipe line, the conduits disposed on opposite sides of the valve; a conduit connected between the other end of each of the tanks and the opposite sides of said motor; reversing valve means for selectively applying pipe line pressure to the liquid in said tanks for reversely actuating said motor; means for manually actuating said valve means; means for storing pipe line pressure fluid; means for impeding the flow of pressure fluid from said storing means; and fluid motor means responsive to a drop in pipe line pressure and actuated by the stored pressure for actuating said reversing valve means.

3. An operator for a pressure fluid conducting pipe line valve comprising a fluid motor having a reversely movable element therein connected to the movable element of the valve; a pair of tanks having liquid therein; conduits connecting one end of each tank to opposite sides of the motor; a reversing valve; conduits connecting the other end of each tank with said reversing valve; a reserve tank for pressure fluid in communication with the pipe line and said reversing valve, the reversing valve selectively applying liquid under pressure to opposite sides of said motor; a diaphragm motor for actuating said reversing valve; a second reserve pressure fluid supply for said diaphragm motor, the pipe line pressure acting on one side of said diaphragm motor and the reserve pressure fluid acting on the other side thereof, the reserve pressure fluid actuating said diaphragm motor upon failure of the pressure fluid in the pipe line; and manually operable means for said reversing valve to reversely move said valve after the pipe line pressure has been restored.

4. A device as defined in claim 3 which includes means for operating said reversing valve responsive to pressure impulses received from an impulse line.

5. A device as defined in claim 3 which includes fluid motors for actuating said reversing valve; selective control valve means for governing the operation of said motors; and a master control valve for governing the operation of said motors and modifying the operation of said selective control valve.

6. A device as defined in claim 3 which includes an impulse line connectable with a companion pipe line valve and said reversing valve; and a diverter valve actuated by said diaphragm motor for controlling the movement of impulses in the impulse line.

7. An operator for a pressure fluid conducting pipe line valve comprising a fluid motor having a reversely movable element therein connected to the movable element of the valve; a pair of tanks having liquid therein; conduits connecting one end of each tank to opposite sides of the fluid motor; a reversing valve; conduits connecting the other end of each tank with said reversing valve; conduits connecting said reversing valve with the pipe line; a reserve tank for pressure fluid in communication with said last mentioned conduits and said reversing valve, the valve selectively applying liquid under pressure to opposite sides of said movable motor element; pressure fluid motors for actuating said reversing valve; a lever for actuating said reversing valve; a reversely operable diaphragm motor for actuating said lever; and means on said diaphragm motor engageable with said lever for preventing actuation thereof until manually released.

8. An operator for a pressure fluid conducting pipe line valve having a reversely movable element therein connected to the movable element of the valve; a pair of tanks having liquid therein; conduits connecting one end of each tank to opposite sides of the fluid motor; a reversing valve; conduits connecting the other end of each tank with said reversing valve; a reserve tank for pressure fluid in communication with the pipe line and said reversing valve, the reversing valve selectively applying liquid under pressure to opposite sides of said movable element; pressure fluid motors for actuating said reversing valve; a lever for actuating said reversing valve; a reversely operable diaphragm motor for actuating said lever; means on said diaphragm motor engageable with said lever for preventing actuation thereof until manually released; an impulse line connected with a companion pipe line valve and said reversing valve; a diverter valve actuated by said diaphragm motor for controlling the movement of impulses in the impulse line; a second reserve pressure fluid supply connected to one side of said diaphragm motor; means for causing pipe line pressure to act on the other side of said diaphragm motor, the reserve pressure fluid from said second reserve supply actuating said diaphragm motor upon failure of pressure fluid in the pipe line; and manually operable means for said reversing valve to reversely move said valve element in the pipe line valve after pipe line pressure has been restored.

9. In a device as defined in claim 3 which includes means for retarding the escape of pressure fluid from the reserve tank for said diaphragm motor until after said diaphragm motor has actuated said reversing valve.

10. An operator for a pipe line valve comprising a fluid motor having a movable member therein connected to the movable element of the valve, a pair of tanks having liquid therein, a conduit connecting one end of each of the tanks and the pipe line, a conduit connected between the other end of each of the tanks and the opposite sides of said motor, reversing valve means for selectively applying pipe line pressure to the liquid in said tanks for reversely actuating said motor, means for manually actuating said valve means, means for storing pipe line pressure fluid, means for impeding the flow of pressure fluid from said storing means, and fluid motor means responsive to a drop in pipe line pressure and actuated by the stored pressure for actuating said reversing valve means.

References Cited in the file of this patent

UNITED STATES PATENTS

| | | |
|---|---|---|
| 1,855,539 | Anderson | Apr. 26, 1932 |
| 1,861,848 | Foulds | June 7, 1932 |
| 1,930,557 | Hughes | Oct. 17, 1933 |
| 2,081,542 | Kidney | May 25, 1937 |
| 2,160,766 | Thomason | May 30, 1939 |
| 2,240,163 | Pick | Apr. 29, 1941 |
| 2,316,944 | Ernst | Apr. 20, 1943 |
| 2,326,686 | Rutledge | Aug. 10, 1943 |
| 2,393,805 | Parker | Jan. 29, 1946 |
| 2,435,546 | Mercier | Feb. 3, 1948 |
| 2,435,968 | Kalix | Feb. 17, 1948 |
| 2,569,598 | Buchanan | Oct. 2, 1951 |
| 2,630,829 | Shafer | Mar. 10, 1953 |

FOREIGN PATENTS

| | | |
|---|---|---|
| 728,436 | Germany | Nov. 27, 1942 |